United States Patent [19]

Herrmann

[11] 3,757,790
[45] Sept. 11, 1973

[54] THRESHOLD ANALYZER AND STIMULATOR TESTING DEVICE WITH INTERNAL GENERATOR

[76] Inventor: Cal C. Herrmann, c/o ESB Inc., P. O. Box, Phila., Pa. 19101

[22] Filed: May 5, 1971

[21] Appl. No.: 140,360

[52] U.S. Cl. ......... 128/419 P, 128/2.05 R, 128/421
[51] Int. Cl. .............................................. A61n 1/36
[58] Field of Search ................. 128/2.05 R, 2.05 T, 128/2.06 F, 2.06 G, 2.06 R, 2.1 A, 2.1 P, 419 P, 421, 422

[56] References Cited
UNITED STATES PATENTS

| | | | |
|---|---|---|---|
| 3,426,748 | 2/1969 | Bowers | 128/2.06 R |
| 3,554,198 | 1/1971 | Tatoian et al. | 128/419 P |
| 3,648,708 | 3/1972 | Haeri | 128/422 |

OTHER PUBLICATIONS

Gerst et al., "Journal of Thoracict Cardiovascular Surgery" Vol. 54, No. 1, July, 1967, pp. 92–102.

Bracale et al., "Medical and Biological Engineering," Vol. 8, No. 1, January, 1970, pp. 103–105.

Primary Examiner—William E. Kamm
Attorney—Robert H. Robinson, Raymond L. Balfour, Anthony J. Rossi and Thomas A. Lennox

[57] ABSTRACT

A threshold analyzer including a stimulator testing device measures the minimum impulse energy required to stimulate a body organ using the actual body implanted stimulating electrode system. A stimulating device to be implanted in the body may be connected to the implanted electrode system and its output impulse energy measured. Means are provided to calibrate the threshold analyzer stimulator testing device so that readings taken at different times as well as on different patients will be suitable for correlation. Readings are indicated in terms of true current and voltage values.

8 Claims, 2 Drawing Figures

INVENTOR.
Cal C. Herrmann

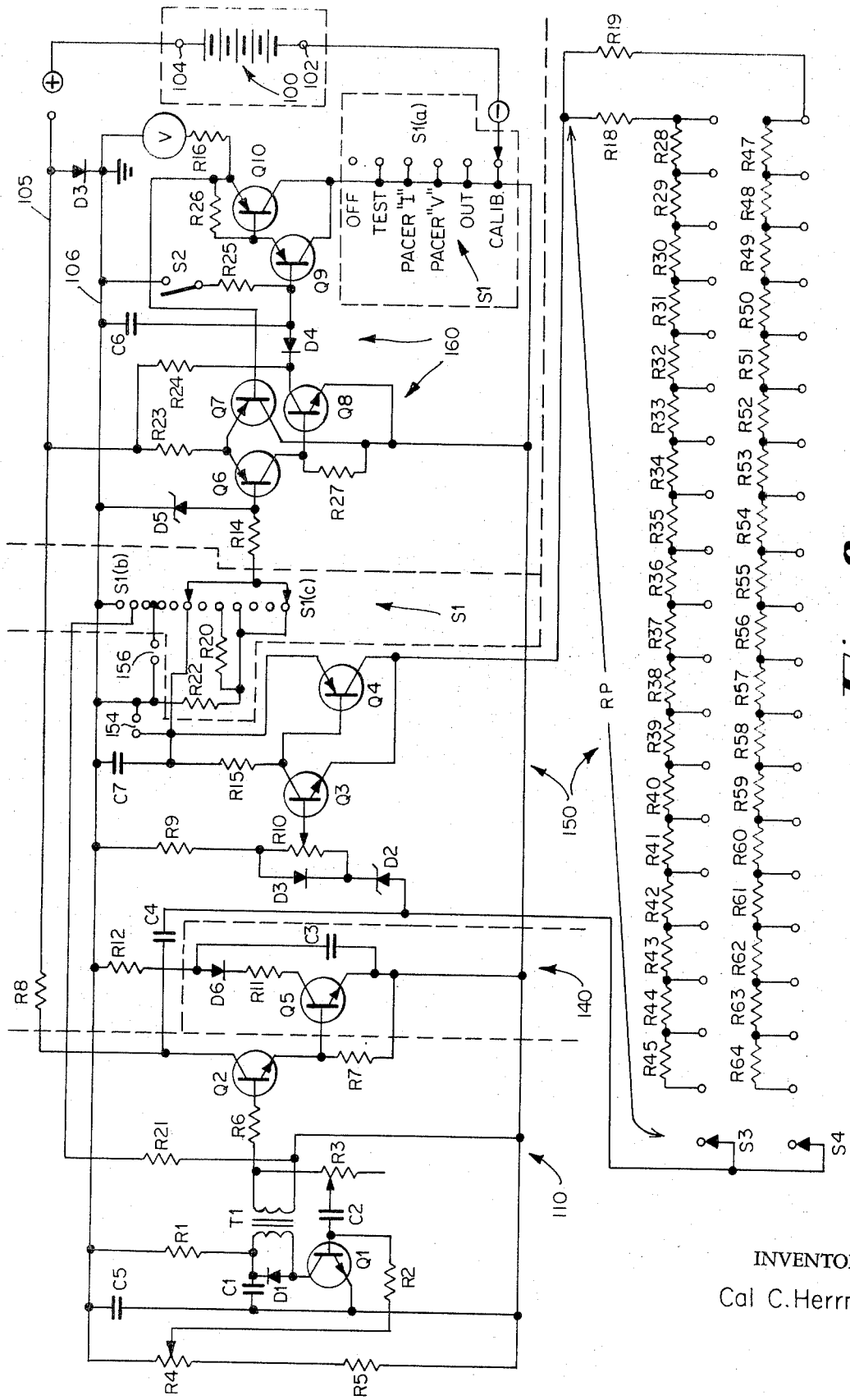

THRESHOLD ANALYZER AND STIMULATOR TESTING DEVICE WITH INTERNAL GENERATOR

BACKGROUND OF THE INVENTION

1. Field of the Invention

This invention relates to body organ stimulating devices. In particular, it relates to means for measuring the output of body organ stimulating devices and the minimum requirements for body organ stimulation as measured on the patient. The invention will be described in most detail in association with cardiac stimulating devices or heart pacers because the invention was particularly developed for use with heart pacers. However, the invention may be used in conjunction with other body organ stimulating devices or in other applications requiring an internally calibrateable current controlled pulse train including non-medical applications. The device has its own built-in low voltage power supply.

2. Description of the Prior Art

The extension of human life by the use of implanted heart stimulating devices has been carried out with great effectiveness for approximately a decade. In order to simplify the implanting operation, in order to be sure that the heart stimulating electrodes are properly located, and particularly to insure that the implantable stimulator is in proper operating condition, it has been found desirable to measure the minimum heart stimulating impulse current required by the patient and compare it to the output of the stimulating device with which he will be supplied.

For convenience, the term threshold has been applied by the medical profession to the minimum stimulating impulse. Several devices for determining the threshold impulse have been previously described in the prior art. The generic name of threshold analyzer follows from the above terminology and this too has been accepted by the medical profession. It will be used in the following discussion for a device capable of measuring the threshold impulse. In general, the threshold analyzers previously described have measured the minimum stimulating current requirement in terms of fractions of the output of the stimulator to be used with an individual patient. Thus, with the threshold analyzers available, there is little opportunity for obtaining statistical information on actual energy requirements. Further, when a particular stimulator-electrode combination does not appear to have sufficient factor of safety for a reasonably long implant, there is no direct way with the analyzer described to determine whether it is the electrode system or the stimulator that is at fault.

In my co-pending application Ser. No. 140,361 filed May 5, 1971, a form of threshold analyzer comprising a simplified circuit for controlling the pulse current of a stimulating pulse is described. The simplified form of threshold analyzer is ideal for use in hospitals where there may be only a few implants per month or where a low cost disposable analyzer is desired. However, for larger hospitals where implanting operations may be required several times a week, the more complete unit described in this application is required.

Sad experience has shown that it can be extremely dangerous to use any form of electrical apparatus in a hospital operating room that connects to the 110 volt A-C hospital lines. Further, it has been suggested by experience that for maximum safety to the patient, voltages applied directly to the heart should never exceed approximately 25 volts.

SUMMARY OF THE INVENTION

In the threshold analyzer of the present invention, a built-in stimulator provides stimulating pulses of known and adjustable current values, adjustable rates and adjustable duration. Means for reading the voltage of the pulses are also provided. Further means are provided for attaching an implantable stimulator to the analyzer and measure its pulse energy output. Readings are provided in true current and voltage units. Calibration means are included so that the readings taken have permanent and correlatable value.

BRIEF DESCRIPTION OF THE DRAWINGS

FIG. 2 is a schematic diagram of a particular embodiment of the invention.

DESCRIPTION OF THE PREFERRED EMBODIMENT

Figure 1:
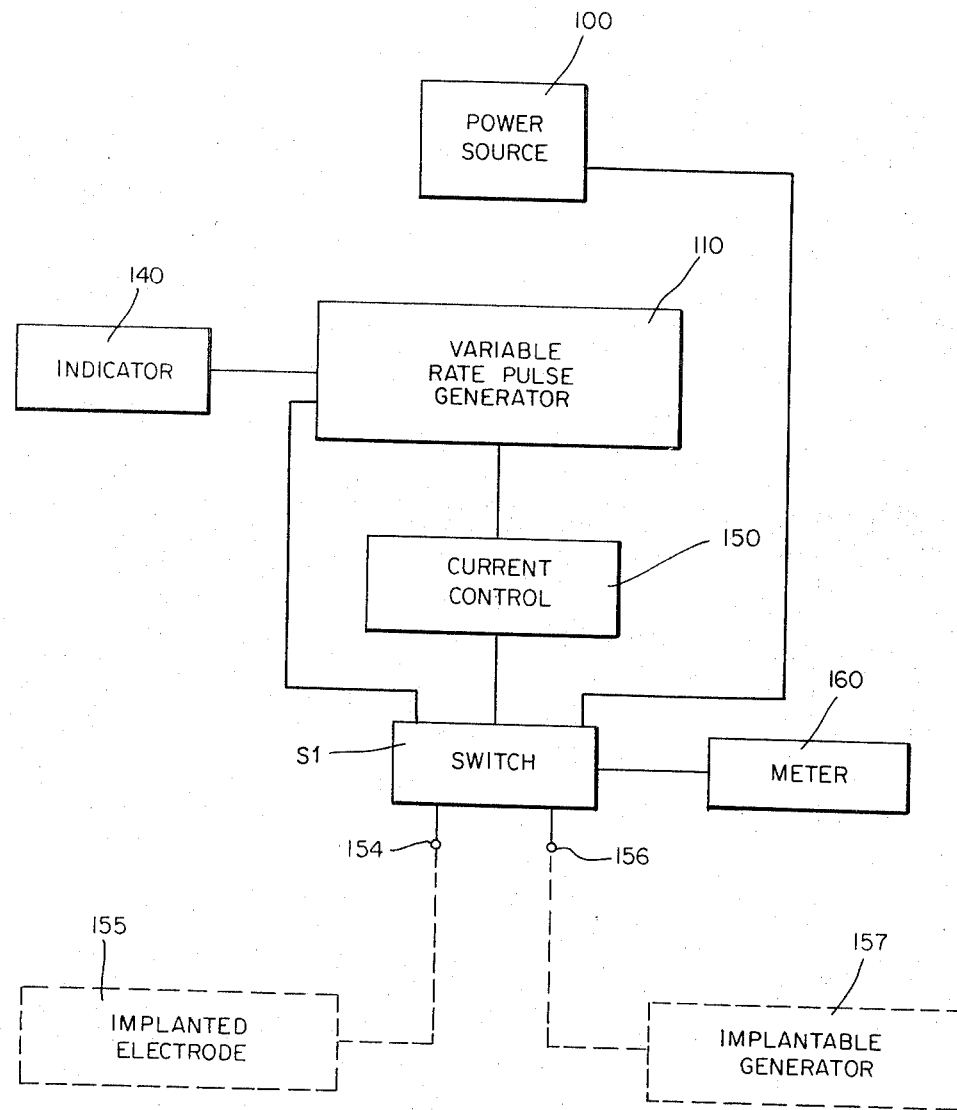
FIG. 1 represents in block form the functional components of the tester and its connections with an implantable electrode system as well as an implantable heart stimulator.

An internal variable rate pulse generator means 110, FIG. 1, fed by a power supply means 100 forming part of the threshold analyzer of the invention provides a series of stimulating pulses. These pulses are adjustable in period and length and can be made to issue at a typical rate for human heart stimulation between about 25 – 175 per minute. For animal units, other ranges may be supplied. A pulse indicating means 140 provides a visual signal with each pulse produced by generator 110. Means are provided to control the pulse rate (FIG. 2, $R_4$) and control the pulse duration (FIG. 2, $R_3$) to the values desired by the attendant surgeon. The pulses issuing from the generator 110 are more than ample to stimulate under any conditions. The pulse generator 110 feeds a variable current controlling means 150. This current control means 150 is selectively variable at the wish of the surgeon in charge and controls the pulse current to that selected regardless of the voltage required up to a practical limit to transmit the pulse to the patient. The actual current output of the current control means is selected by a dial switch (FIG. 2, 52 and 53) on the instrument. The current control means connects to a multi-position switch $S_1$. Also connected to the switch $S_1$ are output terminals 154 for connection to an implanted stimulating electrode system, input terminal 156 for connection to an implantable heart stimulating device and a voltage and current indicating means 160 referred to as a peak holding voltmeter.

The normal useage of this device in connection with a heart pacer implant will commence when a surgeon, cardiologist or veterinarian has operated on the patient and has implanted the permanent heart stimulating electrode 155 in the heart of the patient and wishes to commence stimulating the patient with implanted permanent electrodes 155 as will be more fully explained with reference to FIG. 2. Prior to the time of the operation, it is desirable to check the threshold analyzer by its self-contained means to be sure the battery is fresh and that the calibration of the device is correct. The surgeon then removes what other stimulating means that had been in use prior to the installation of the permanent electrodes and connects the threshold analyzer to the freshly implanted electrodes 155. The pulse rate of the threshold analyzer can be determined by timing the flashes of the pulse indicating means 140 and can be adjusted by the means provided to give a rate that the surgeon feels is desirable. When the patient and threshold analyzer are coordinated and working together, the surgeon then determines the minimum pulse power required by the patient. To do this, the peak holding voltmeter 160 is switched by the multiple switch means $S_1$ across the terminals of the implanted electrode system 155. Then the stimualting pulse current produced by the generator 110 is gradually reduced by adjustment of the selectively variable current control means 150 until the threshold, i.e. minimum, current and voltage for stimulation are reached. If the threshold stimulating impulse current and voltage is noticeably different than a value that the surgeon feels is normal for the patient based upon experience, the surgeon is warned that the electrodes may not be properly placed or are otherwise malfunctioning.

Next, the implantable generator 157 is connected by the switch means $S_1$ to the meter circuit 160 and the output of the device in terms of peak pulse current and peak pulse voltage is determined. For proper and long operating life of the implanted stimulator, its available power output, i.e. current and voltage, when new, should be several times the threshold power required by the implanted electrode system, as previously determined.

After these measurements are completed, the surgeon performs the implanting operation for the implantable generator 157. At a suitable moment, the patient is detached from the analyzer and permanently connected to the implanted generator 157 and the operation is completed insofar as implantation of the pacer is concerned. Having followed these procedures insofar as the implantation of the permanent generator 157 is concerned, the surgeon is assured that there is every possible reason to believe the operation has been correctly performed and that the implanted device will provide a suitable service for its expected life.

FIG. 2 is a detailed diagram of a particular embodiment of the invention. In a tabulation below, values and other information relating to the parts shown in FIG. 2 are listed.

A small 22.5 volt battery 100 is a preferred power supply for the threshold analyzer because of its common use and wide distribution. To the negative terminal 102 of battery 100 is attached a deck $a$ of a ganged multi-position, multi-point switch $S_{1a}$, $S_{1b}$, $S_{1c}$. The positive terminal 104 of battery 100 is attached to a plus voltage line 105. A diode $D_3$ serves to drop the voltage of 105 by about 0.7 volts. The line 106 which is fed by the diode $D_3$ serves as the common ground for the circuit.

The portion of the threshold analyzer indicated generally at 110 is the variable pulse generator 110. This is a conventional blocking oscillator circuit. Transistor $Q_1$ and transformer $T_1$ with feedback loop including variable resistor $R_3$ and capacitor $C_2$ constitute a blocking oscillator. The pulse rate of the oscillator is determined by the flow of current through the voltage divider resistors $R_4$, $R_5$, the series resistor $R_2$ and capacitor $C_2$. The length of each pulse is determined by the combined action of resistor $R_3$ and capacitor $C_2$. Capacitor $C_1$ and resistor $R_1$ serve to decouple the oscillator from the power supply. Diode $D_1$ serves to suppress the transient voltage appearing in the primary of transformer $T_1$ when transistor $Q_1$ switches off.

This pulse generator 110 supplies the heart stimulating pulses when the threshold analyzer is being used for heart stimulation as described above. It is to be noted that both the pulse length and pulse frequency are easily variable by adjusting $R_3$ and $R_4$, respectively.

An amplifying transistor $Q_2$ forming a part of the pulse generator 110 amplifies the pulses produced by the oscillator transistor $Q_1$. Resistor $R_6$ limits the base current to transistor $Q_2$. Resistor $R_8$ is the load resistor for transistor $Q_2$. Capacitor $C_4$ couples the output of amplifier $Q_2$ to another portion of the circuit, namely, the variable current control indicated generally in FIG. 2 by 150.

The indicator circuit 140 comprises light control transistor $Q_5$ fed from the emitter of transistor $Q_2$. Transistor $Q_5$ excites diode $D_6$ with each pulse of the pulse generator circuit 110 thus giving a visual indication of each pulse of the generator. Although a glow lamp might be used instead of the light emitting diode $D_6$, there are advantages in using the latter. A glow lamp requires about double the voltage available in this circuit. This could be supplied from a high voltage battery. However, the battery voltage would have to be greater than 50 volts. Under circuit failure conditions, it then might be possible to apply this voltage to the patient with results that could be disasterous. Without the high voltage battery, a doubler circuit could be used. However, this introduces additional circuit components and their associated complications. It will be observed that the light control transistor $Q_5$ is driven from the emitter of amplifying transistor $Q_2$. By driving $Q_5$ from the emitter of $Q_2$, voltage losses are kept to a minimum and by this means, there is sufficient voltage available to properly operate the light emitter diode $D_6$. Further details of the circuit include a resistor $R_{11}$ serving to limit the current flow through the transistor ($Q_5$)— diode ($D_6$) circuit, and capacitor $C_3$ and resistor $R_{12}$ which decouple the light circuit from the power supply.

Resistor $R_7$ located between the base and emitter of transistor $Q_5$ insures that $Q_5$ turns off when not stimulated by transistor $Q_2$.

The variable current control portion of the circuit 150, as stated above, is fed from the oscillator-amplifier circuit 110 by the rather large (10 mfd) capacitor $C_4$. This capacitor is sufficiently large to pass a full stimulating pulse from the generator 110 to the variable current control means 150.

In FIG. 2, the portion of the circuitry indicated by 150 represents the current control. Zener diode $D_2$ and diode $D_7$ with potentiometer $R_{10}$ in parallel constitute a constant voltage reference between the voltage at $C_4$ and the base of transistor $Q_3$. The principal voltage drop of the circuit occurs across Zener $D_2$. Diode $D_7$ with potentiometer $R_{10}$ in parallel provides an adjustable small voltage increment by which the current control circuit may be standardized. Resistor $R_9$ provides current syncronization for the voltage reference circuit so the voltage across $R_9$ varies with input voltage from $C_4$ while the voltage across $D_2$ and $D_7$ remains constant. Transistor $Q_4$ transmits the stimulating pulse from the precision resistor bank to the implanted stimulating electrode indicated by output on the circuit diagram. $Q_4$ is controlled by $Q_3$ so as to maintain zero voltage change between the arm of $R_{10}$ and the emitter of $Q_4$. In doing this, it will be seen that a constant voltage drop equal to the reference voltage is held across the precision resistor bank RP and hence, a constant pulse current.

Resistor 15 serves to insure that $Q_4$ turns off with $Q_3$ and capacitor $C_7$ bypasses any possible undesirable high frequency transients that might otherwise appear across the output terminals. The precision resistor RP comprises two banks in parallel. A first bank with multi-position switch $S_3$ is arranged to control the pulse current from 0 to 19 ma in 1 ma steps while the second bank with switch $S_4$ is arranged to add a current up to 0.95 ma in steps of 1/20 ma. Thus, currents varying from 0.05 to 19.95 ma in steps of 1/20 ma can be provided by the circuitry described above. This current range more than covers the extremes that have been found suitable for cardiac stimulation.

The multi-position switch $S_1$ is a three deck, six position switch. As mentioned earlier, the first switch deck $S_{1a}$ serves to connect or disconnect the battery 100 from the analyzer. The second and third decks $S_{1b}$ and $S_{1c}$ connect an implanted electrode, an implantable stimulator and a voltage and current measuring device into the circuit.

It will be noted that when switch $S_1$ is in a first position, all functions are disconnected.

The second position of switch $S_1$ is a battery test position in which the voltage measuring means connects to read the voltage of the power supply means. In this position, the battery is connected in series with $R_{21}$, $R_{20}$ and $R_{22}$ as well ad diode $D_3$. The voltage across $R_{20}$ and $R_{21}$ is measured by the voltmeter circuit. The purpose of this check is to indicate the condition of the battery. If the battery shows a low voltage on this test, it must be replaced.

The third position of switch $S_1$ measures stimulator current. The output of an implantable pulse generator attached to the input terminals of the analyzer is connected to a precision resistor $R_{22}$. At the same time, the peak reading voltmeter 160 is connected by switch $S_{1c}$ across resistor $R_{22}$. Under these conditions, the voltage measured across $R_{22}$ is an indication of the current flow therethrough and the constants of the circuit are such that the readings of meter V correspond to milliamperes without further interpolation.

The fourth position of switch $S_1$ is a voltage measuring position. In this position, the lead connecting resistor 22 across the output of the implantable generator is broken with the result that voltmeter 160 now reads the open circuit peak voltage of the implantable generator.

In the fifth position of switch $S_1$, the pulse generating means of the threshold analyzer is connected through the current control means to the implanted stimulating electrode and the voltage measuring means is connected to measure the resulting pulse voltage. The stimulating pulses are fed through the current control device so that pulses of known current can be fed to the electrode. The voltmeter is connected across the electrode terminals so that the peak pulse voltage may be measured for any value of input current.

The sixth position of switch $S_1$ is for purposes of calibration. The output of the pulse generator after passing through the current control means is fed to the current measuring means.

The actual current flow through $R_{22}$ is measured and compared to the value shown on the selector switch. If the two values do not agree, the instrument is corrected by adjustment of $R_{10}$.

Finally, the peak holding voltmeter is indicated by 160 by FIG. 2. A voltage pulse if fed from the terminal of $S_1$ to resistor 14 whose principal function is to protect the circuit from excessively high currents. Zener diode $D_5$ connected from the output of $R_{14}$ to ground serves to protect the circuit from dangerously high voltage peaks. The three transistors $Q_6$, $Q_7$ and $Q_8$ form a differential amplifier circuit. When a voltage pulse is received by $Q_6$, it is amplified and is fed to capacitor $C_6$ via diode $D_4$. The purpose of $D_4$ is to stop reverse current flow which would discharge $C_6$. $C_6$ is rapidly charged up to a potential equal to the peak voltage of the incoming pulses. Thus, the differential amplifier comprising $Q_6$, $Q_7$ and $Q_8$ is in fact an error-correcting circuit in which the voltage on capacitor $C_6$ is compared and corrected to the peak voltage of a stimulating pulse generated either by the internal pulse generator 110 or the external implantable generator 157.

A second amplifier $Q_9$ and $Q_{10}$ measures the voltage of $C_6$. The emitter of $Q_{10}$ feeds back to the base of $Q_7$ so that the differential amplifier $Q_6$, $Q_7$ and $Q_8$ is turned off as soon as the base of $Q_{10}$ reaches the value of the input to $Q_6$, thus stopping further charging of $C_6$. The emitter of $Q_{10}$ also feeds a meter movement V by which voltage and current readings may be made through resistor $R_{16}$. The value of $R_{16}$ is chosen so that the full scale reading of V is equal to 10 volts when 10 volts is applied to the input of $R_{14}$.

It will be seen that the circuit comprising $Q_6$, $Q_7$ and $Q_8$ forms a single-ended differential amplifier, obtaining the required working voltage bias from the drop provided by diode $D_3$. It is possible to use a single ended design because the pulses produced by the pulse generator 110 are unidirectional (negative polarity). In order that meter V will read all the way to ground potential, it is necessary that the amplifier $Q_6$, $Q_7$ and $Q_8$ have a small amount of voltage on the other side of ground. Therefore, diode $D_3$ is inserted between the battery terminal and the ground terminal 106. Diode $D_3$ provides about 0.7 volts positive bias for $Q_6$, $Q_7$ and $Q_8$ working through resistors $R_{23}$ and $R_{24}$.

When using meter V and changing from one input to another, it is necessary that all charge is removed from $C_6$. For this reason, the condenser discharge circuit comprising pushbutton switch $S_2$ and resistor $R_{25}$ is located across $C_6$. Before taking a reading, it is desirable to close $S_2$ for a moment. Resistor $R_{23}$ is the load resistor for $Q_6$ and $Q_7$ and resistor $R_{24}$ is the load resistor for $Q_8$. $R_{27}$ insures that $Q_8$ turns off when transistor $Q_6$ is turned off. $R_{26}$ insures that $Q_{10}$ will turn off when $Q_9$ turns off.

The values of the several components of the circuit are listed herewith:

PARTS LIST

| Resistors | Resistors | Transistors |
|---|---|---|
| $R_1$ — 10K | $R_{39}$ — 560 | $Q_1$ — 2N5449 |
| $R_2$ — 2.2M | $R_{40}$ — 680 | $Q_2$ — 2N5449 |
| $R_3$ — 500 | $R_{41}$ — 1.0K | $Q_3$ — 2N5449 |
| $R_4$ — 1M | $R_{42}$ — 1.3K | $Q_4$ — 2N5447 |
| $R_5$ — 120K | $R_{43}$ — 2.0K | $Q_5$ — 2N5449 |
| $R_6$ — 1K | $R_{44}$ — 3.3K | $Q_6$ — 2N5447 |
| $R_7$ — 1M | $R_{45}$ — 6.8K | $Q_7$ — 2N5447 |
| $R_8$ — 5.6L | $R_{47}$ — 5.6 | $Q_8$ — 2N5449 |
| $R_9$ — 27K | $R_{48}$ — 6.2 | $Q_9$ — 2N5447 |
| $R_{10}$ — 10K | $R_{49}$ — 6.8 | $Q_{10}$ — 2N5447 |
| $R_{11}$ — 10 | $R_{50}$ — 7.5 | |

| | | |
|---|---|---|
| $R_{12}$ — 56K | $R_{51}$—8.2 | Capacitors |
| $R_{14}$ — 100K | $R_{52}$—10.2, 1% | $C_1$—10M |
| $R_{15}$ — 20K | $R_{53}$—12.1, 1% | $C_2$—1M |
| $R_{16}$ — 19.1K, 1% | $R_{54}$—14.3, 1% | $C_3$—50M |
| $R_{18}$ — 1.91K, 1% | $R_{55}$—16.5, 1% | $C_4$—10M |
| $R_{19}$ — 100, 1% | $R_{56}$—20.5, 1% | $C_5$—20M |
| $R_{20}$ — 15K | $R_{57}$—26.1, 1% | $C_6$—1M |
| $R_{21}$ — 20K | $R_{58}$—32.4, 1% | $C_7$—1K |
| $R_{22}$ — 499, 1% | $R_{59}$—43.2, 1% | |
| $R_{23}$ — 22K | $R_{60}$—60.4, 1% | Switches |
| $R_{24}$ — 22K | $R_{61}$—95.3, 1% | $S_1$—3PGT (function) |
| $R_{25}$ — 1M | $R_{62}$—154, 1% | $S_2$—pushbutton spst no |
| $R_{26}$ — 10M | $R_{63}$—294, 1% | $S_3$—20 position, JBT MS—20—15 |
| $R_{27}$ — 100K | $R_{64}$—953, 1% | $S_4$—20 position, JBT MS—20—15 |
| $R_{28}$ — 105, 1% | | |
| $R_{29}$ — 118, 1% | Diodes | Transformers |
| $R_{30}$ — 130, 1% | $D_1$—1N4001 | $R_1$—TR—23 |
| $R_{31}$ — 147, 1% | $D_2$—1N702 | |
| $R_{32}$ — 165, 1% | $D_3$MR 2360 | |
| $R_{33}$ — 191, 1% | $D_4$—LN456 | |
| $R_{34}$ — 221, 1% | $D_5$—1N766 | |
| $R_{35}$ — 255, 1% | $D_6$—5082–4403 (H-P) | |
| $R_{36}$ — 300 | $D_7$—MR2360 | |
| $R_{37}$ — 360 | | |
| $R_{38}$ — 470 | | |

Having described my invention and given a detailed description of a typical embodiment, I hereby claim:

1. A threshold analyzer which comprises:
 a. an electrical power supply having an output;
 b. an internal means for generating electrical pulses having an input and an output, the input thereof operatively connected to the output of the power supply, the internal means for generating translating the power of the power supply into electrical pulses;
 c. a selectively variable current control means having an input and an output, the input thereof operatively connectable to the output of the internal means for generating electrical pulses and receiving electrical pulses therefrom, the output of the control means delivering selectively variable current pulses;
 d. a means for measuring pulse current and pulse voltage, the means for measuring including an input and an output;
 e. a first terminal operatively connectable to the input of the means for measuring, the first terminal being also operatively connectable to a body implantable stimulating pulse generator external to the threshold analyzer;
 f. a second terminal operatively connectable to the output of the means for measuring, the second terminal being operatively connectable to a body implantable stimulating electrode, the electrode being external to the threshold analyzer;
 g. switch means constructed and arranged to selectively interconnect selected portions of the threshold analyzer including, the current control means to the measuring means, the first terminal to the input of the means for measuring, and the output of the means for measuring to the second terminal.

2. A threshold analyzer as defined in claim 1 wherein the voltage and the current measured by the means for measuring is the peak voltage and the peak current of the pulses received by the input thereof.

3. A threshold analyzer as defined in claim 1 including a visual pulse indicating means operatively connected to the pulse generator.

4. A threshold analyzer as defined in claim 3 wherein the visual pulse indicating means includes a light emitting diode and a transistor having an input and an output, the input being operatively connected to the pulse generating means the output being connected to the light emitting diode.

5. A threshold analyzer as defined in claim 1 wherein the means for measuring includes a voltage storage capacitor and an error correcting means operatively connected thereto, the error correcting means further connected to the input of the means for measuring, so that a voltage signal stored on the capacitor is compared and corrected by the error correcting means to the peak voltage of electrical pulses received by the means for measuring.

6. A threshold analyzer and testing apparatus for body implantable stimulating pulse generators and body implanted electrode systems which comprises:
 a. an electrical power supply means;
 b. an internal pulse generating means operatively connected to the power supply means for translating the power of the power supply into electrical stimulating pulses;
 c. a selectively variable current control means operatively connected to the output of the internal pulse generating means for controlling the output thereof;
 d. a means including an input and an output thereto for measuring the pulse voltage and pulse current of electrical stimulating pulses;
 e. an input terminal operatively connectable to the input of the means for measuring and an output terminal operatively connectable to the output thereof;
 f. a multi-position switch constructed and arranged for selectively interconnecting preselected portions of the threshold analyzer and testing apparatus including the internal pulse generating means, the selectively variable current control means and the measuring means, and for selectively interconnecting the threshold analyzer and testing apparatus including selected portions thereof with a body implantable stimulating pulse generator and a body implanted electrode system, when the body implantable generator is operatively connected to the input terminal of the means for measuring and the electrode system is operatively connected to the output terminal thereof.

7. A threshold analyzer as defined in claim 6 wherein the means for measuring includes a voltage storage capacitor and an error correcting means operatively connected thereto, the error correcting means further connected to the input of the means for measuring, so that a voltage signal stored on the capacitor is compared and corrected by the error correcting means to the peak voltage of electrical pulses received by the means for measuring.

8. A threshold analyzer which comprises:
 a. an electrical power supply;
 b. an internal pulse generating means operatively connectable to the power supply for translating electrical power from the power supply into electrical pulses, the pulse generating means having an output;
 c. a selectively variable current control means operatively connectable to the power supply, the control means having an input and an output, the input being connected to the output of the internal pulse generating means and the output thereof being connectable to an implanted stimulating electrode;

d. a measuring means having an electrical sensing input and a visual output;
e. a resistor;
f. a first terminal to which a body implantable pulse generator, external to the threshold analyzer may be electrically connected;
g. a second terminal to which a body implantable stimulating electrode may be electrically connected;
h. switch means constructed and arranged to operatively connect the power supply to the internal pulse generating means, the current control means, and the measuring means; and,
i. additional switch means constructed and arranged to operatively and sequentially connect the sensing input to the power supply, the first terminal to the sensing input, the output of the control means in parallel to the sensing input and to the second terminal, and the output of the control means to the resistor and the sensing input in parallel.

* * * * *